US009821253B2

United States Patent
Moreira-Espinoza et al.

(10) Patent No.: US 9,821,253 B2
(45) Date of Patent: Nov. 21, 2017

(54) AXIALLY COMPACT FUEL FILTER

(71) Applicant: Motor Components, LLC, Elmira Heights, NY (US)

(72) Inventors: Edison X. Moreira-Espinoza, Horseheads, NY (US); Kenneth F. Seager, Sr., Big Flats, NY (US)

(73) Assignee: Motor Components, LLC, Elmira Heights, NY (US)

( * ) Notice: Subject to any disclaimer, the term of this patent is extended or adjusted under 35 U.S.C. 154(b) by 354 days.

(21) Appl. No.: 14/083,638

(22) Filed: Nov. 19, 2013

(65) Prior Publication Data

US 2015/0136684 A1    May 21, 2015

(51) Int. Cl.
| | | |
|---|---|---|
| *B01D 27/08* | (2006.01) | |
| *B01D 29/15* | (2006.01) | |
| *B01D 35/00* | (2006.01) | |
| *B01D 35/30* | (2006.01) | |
| *F02M 37/22* | (2006.01) | |

(52) U.S. Cl.
CPC ............ *B01D 29/15* (2013.01); *B01D 27/08* (2013.01); *B01D 35/005* (2013.01); *B01D 35/30* (2013.01); *B01D 2201/302* (2013.01); *F02M 37/22* (2013.01)

(58) Field of Classification Search
CPC ...... B01D 29/15; B01D 35/005; B01D 35/30; B01D 35/306; B01D 2201/302; B01D 27/08; F01M 11/03; F02M 37/22; F02M 37/221; F02M 37/223
See application file for complete search history.

(56) References Cited

U.S. PATENT DOCUMENTS

| | | |
|---|---|---|
| 3,382,984 A | 5/1968 | Kuss |
| 3,685,972 A | 8/1972 | De Palma et al. |
| 3,782,083 A | 1/1974 | Rosenberg |
| 3,841,489 A | 10/1974 | Combest et al. |
| 3,890,232 A | 6/1975 | Combest et al. |
| 4,036,758 A | 7/1977 | Combest |
| 4,592,839 A | 6/1986 | Rosenberg |
| 5,972,213 A | 10/1999 | Golan |
| 6,210,572 B1 | 4/2001 | Tulchinskiy |

(Continued)

FOREIGN PATENT DOCUMENTS

| | | |
|---|---|---|
| DE | 1930082 | 12/1970 |
| DE | 3534240 | 3/1987 |

(Continued)

*Primary Examiner* — Lucas Stelling
(74) *Attorney, Agent, or Firm* — Simpson & Simpson, PLLC

(57) ABSTRACT

A fuel filter, including: a housing, an inlet port, and an outlet port. The housing includes: a first axially disposed side wall forming a radially outermost portion of a circumference for the housing; a second axially disposed side wall located radially inward of the first axially disposed wall; a first radially disposed end wall connected to a first axial edge of the first axially disposed wall; and a second radially disposed end wall connected to a first axial edge of the second axially disposed side wall. The outlet port extends from the second radially disposed end wall and is radially aligned with the second axially disposed side wall. The inlet port extends from the first radially disposed end wall.

9 Claims, 5 Drawing Sheets

(56) References Cited

U.S. PATENT DOCUMENTS

| | | | |
|---|---|---|---|
| 6,595,371 B1* | 7/2003 | Desmarais | B01D 27/08 210/438 |
| 8,029,592 B2 | 10/2011 | Schramm et al. | |
| 2001/0006161 A1 | 7/2001 | Tulchinskiy | |
| 2005/0072302 A1 | 4/2005 | Miller et al. | |
| 2005/0150569 A1* | 7/2005 | Garvin | B01D 37/025 141/100 |
| 2006/0201870 A1* | 9/2006 | Seto | B01D 29/15 210/435 |
| 2006/0273003 A1 | 12/2006 | Sudo et al. | |
| 2008/0149560 A1 | 6/2008 | Koguchi et al. | |
| 2009/0145826 A1* | 6/2009 | Calcaterra | B01D 27/08 210/137 |

FOREIGN PATENT DOCUMENTS

| | | |
|---|---|---|
| DE | 102009046094 | 5/2011 |
| EP | 1070529 | 1/2001 |

* cited by examiner

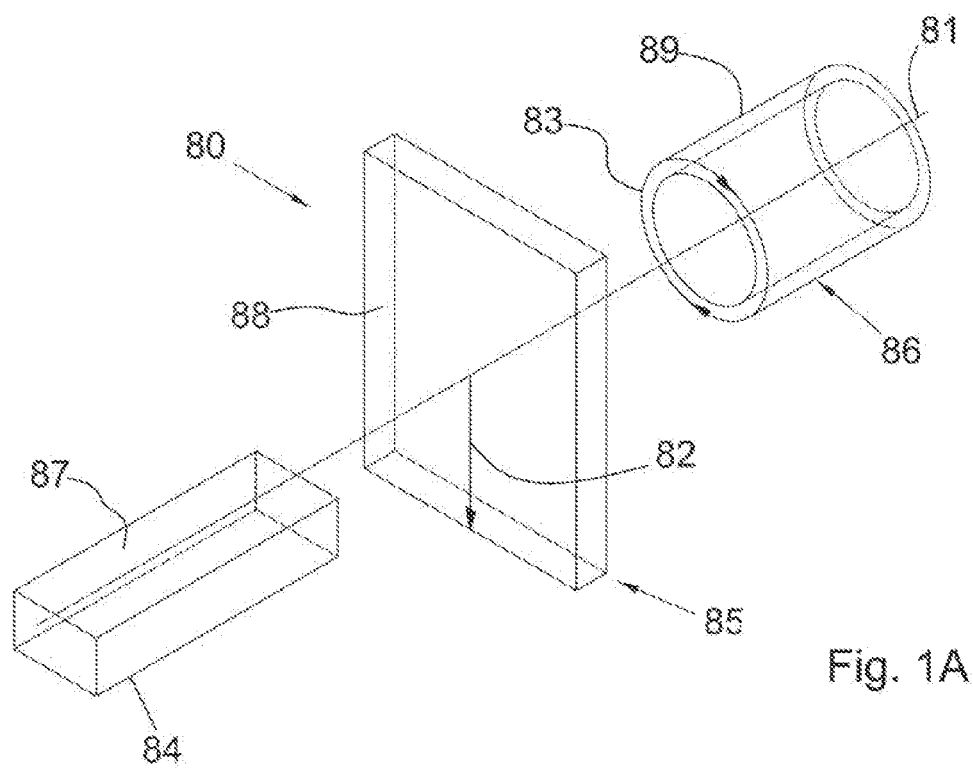
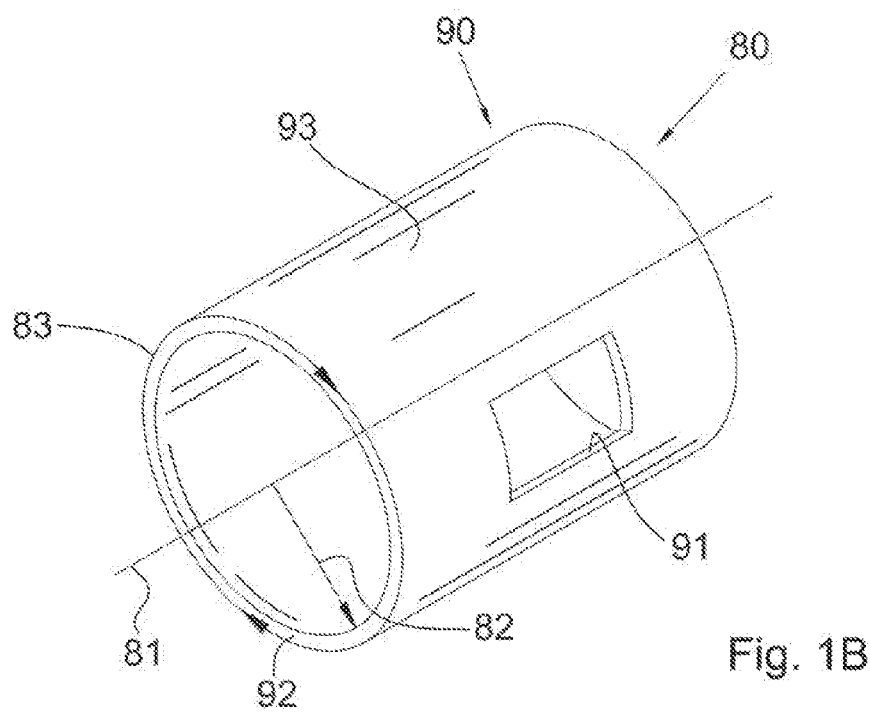
Fig. 1A
Fig. 1B

AXIALLY COMPACT FUEL FILTER

TECHNICAL FIELD

The present disclosure relates to an axially compact fuel filter, in particular a fuel filter with a recess outlet port.

BACKGROUND

FIG. 7 is a schematic cross-sectional view of typical prior art fuel filter 200. Filter 200 includes housing 202, cavity 204 formed by the housing, filter element 206 located in the cavity, inlet port 208, and outlet port 210. Fuel filters are used in a wide variety of combustion engine applications. In general, it is desirable to minimize axial length 212 of filter 200 while attaining a desired filtering capacity or function. The filtering capacity or function is dependent upon length 216 of element 206, which in turn is dependent upon axial length 214, which along with the respective positions of the input and output ports determines overall axial length 212.

SUMMARY

According to aspects illustrated herein, there is provided a fuel filter, including: a housing, an inlet port, and an outlet port. The housing includes: a first axially disposed side wall forming a radially outermost portion of a circumference for the housing; a second axially disposed side wall located radially inward of the first axially disposed wall; a first radially disposed end wall connected to a first axial edge of the first axially disposed wall; and a second radially disposed end wall connected to a first axial edge of the second axially disposed side wall. The outlet port extends from the second radially disposed end wall and is radially aligned with the second axially disposed side wall. The inlet port extends from the first radially disposed end wall.

According to aspects illustrated herein, there is provided a fuel filter, including: a housing including a first axially disposed side wall forming a radially outermost portion of a circumference for the housing and a second axially disposed side wall located radially inward of the first axially disposed wall; a cavity enclosed by the housing and including a first portion enclosed, in a radial direction, by only the first axially disposed side wall and a second portion radially disposed between the first and second axially disposed side walls; an inlet port open to the cavity; and an outlet port open to the first portion of the cavity and including a distal end radially aligned with the second portion of the cavity.

According to aspects illustrated herein, there is provided a fuel filter, including: a housing including a first and second axially disposed side walls, a first radially disposed end wall directly connected to a first axial end of the first axially disposed side wall, a second radially disposed end wall directly connected to a first axial end of the second axially disposed side wall, and a third radially disposed end wall directly connected to respective second axial ends of the first and second axially disposed side walls; a cavity including a first portion at least partially bounded by the first and third radially disposed end walls and the first axially disposed side wall and a second portion open to the first portion and at least partially bounded by the first and second axially disposed side walls and the third radially disposed end wall; an outlet port open to the first portion of the cavity, and including a first end direction connected to the third radially disposed wall and a distal end radially aligned with the second portion of the cavity and with the first and second axially disposed side walls and separated from the second axially disposed wall, in a radial direction, by a space; an inlet port open to the first portion of the cavity and directly connected to the first radially disposed end wall; and a filter element including an axially extending portion including a first axial end sealed against the second axially disposed wall or the third radially disposed end wall and a radially extending portion directly connected to a second axial end of the axially extending portion and wholly disposed in the first portion of the cavity.

BRIEF DESCRIPTION OF THE DRAWINGS

Various embodiments are disclosed, by way of example only, with reference to the accompanying schematic drawings in which corresponding reference symbols indicate corresponding parts, in which:

FIG. 1A is a perspective view of a cylindrical coordinate system demonstrating spatial terminology used in the present application;

FIG. 1B is a perspective view of an object in the cylindrical coordinate system of FIG. 1A demonstrating spatial terminology used in the present application; and, FIG. 2 is a side view of a fuel filter;

DETAILED DESCRIPTION

Figure 2:
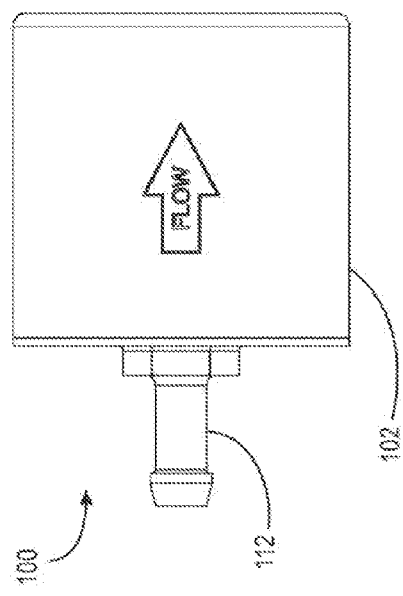

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is a circumferential surface.

FIG. 2 is a side view of fuel filter 100.

Figure 3:
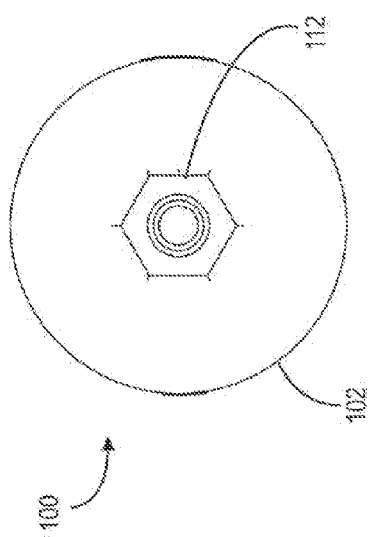
FIG. 3 is an inlet end view of the fuel filter of FIG. 2.

FIG. 3 is an inlet end view of fuel filter 100 of FIG. 2.

Figure 4:
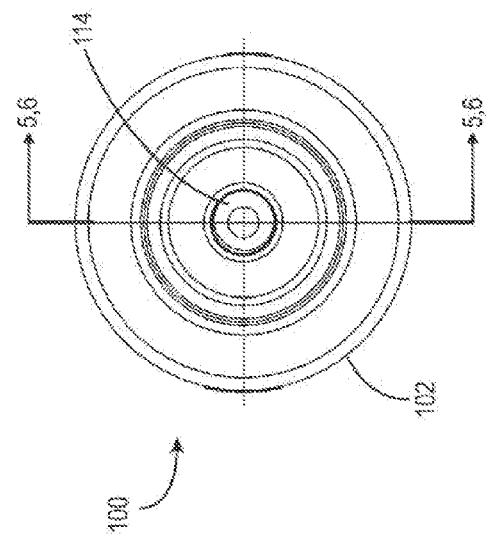
FIG. 4 is an outlet end view of the fuel filter of FIG. 2.

FIG. 4 is an outlet end view of fuel filter 100 of FIG. 2.

Figure 5:
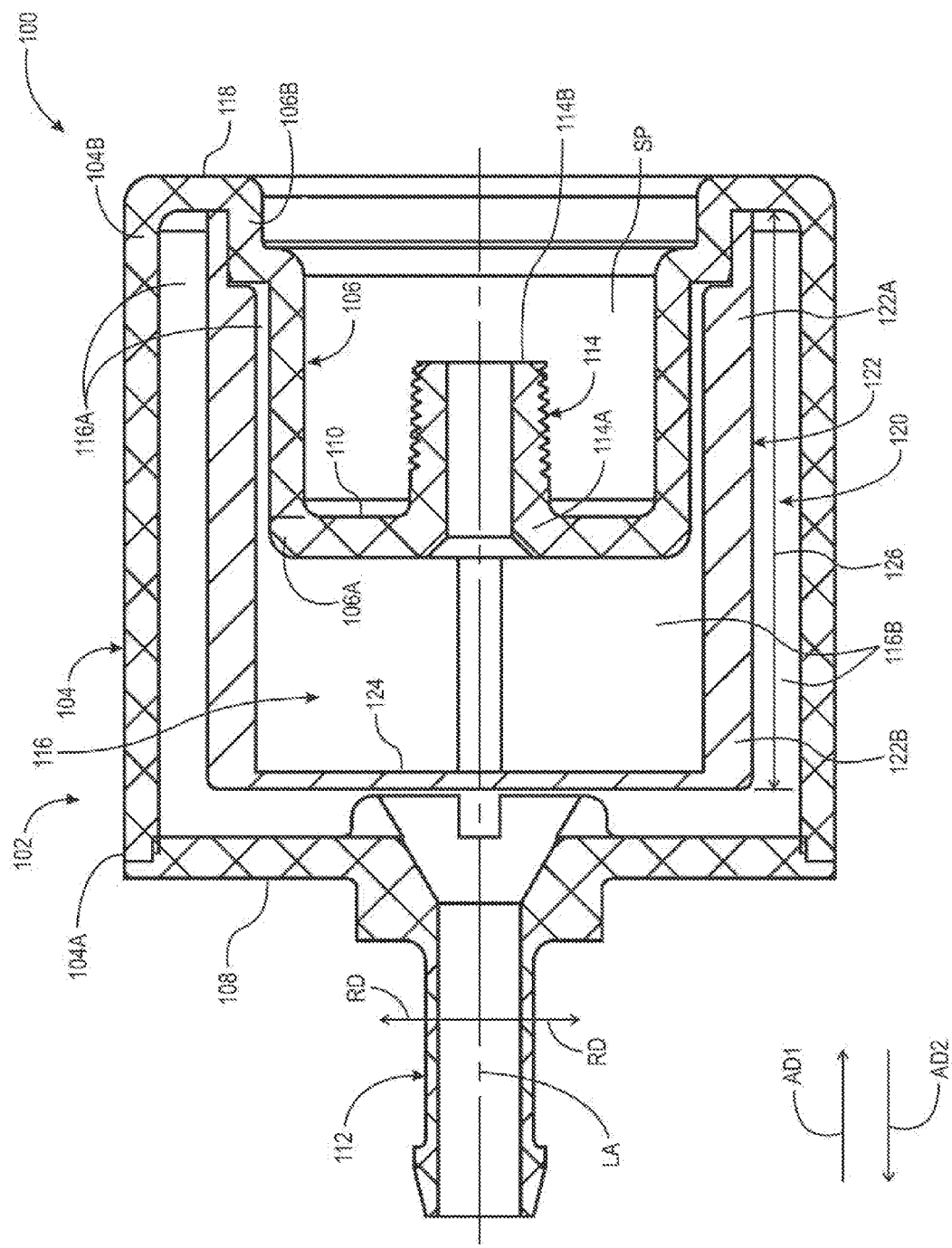
FIG. 5 is a cross-sectional view generally along line 5,6-5,6 in FIG. 4.

FIG. 5 is a cross-sectional view generally along line 5,6-5,6 in FIG. 4. The following should be viewed in light of FIGS. 2 through 5. Fuel filter 100 includes longitudinal axis LA and housing 102 including axially disposed side walls 104 and 106 and radially disposed end walls 108 and 110. Side wall 104 forms a radially outermost portion of a circumference for the housing. Side wall 106 is located radially inward of side wall 104. End wall 108 is connected to axial end 104A of side wall 104. End wall 110 is connected to axial end 106A of side wall 106. Filter 100 includes inlet port 112 and outlet port 114. Inlet port 112 extends from end wall 108. Outlet port 114 extends from end wall 110 and is radially aligned with side wall 106. Note that radial and axial references are with respect to axis LA. As shown in FIG. 5, inlet port 112 and outlet port 114 overlap in axial directions AD1 and AD2, for example, axis LA passes through inlet port 112 and outlet port 114.

In an example embodiment, the outlet port includes axial end 114A directly connected the end wall 110 and distal end 114B radially aligned with side walls 104 and 106. In an example embodiment, an entirety of the outlet port is radially aligned with side walls 104 and 106 and is separated, in radial direction RD, from side wall 106 by space SP external to housing 102.

In an example embodiment, axial direction AD1 is from inlet port 112 toward outlet port 114 and outlet port 114 includes axial end 114A directly connected to end wall 110, and distal end 114B. Each of side walls 104 and 106 extend past distal end 114B in axial direction AD1.

Fuel filter 100 includes cavity 116 enclosed by housing 102. In an example embodiment axial direction AD1 is from inlet port 112 toward outlet port 114 and outlet port 114 includes axial end 114A directly connected to end wall 110, and distal end 114B. Portion 116A of cavity 116 extends past distal end 114B in axial direction AD1.

In an example embodiment, the housing includes radially disposed end wall 118 connecting axial end 104B, opposite axial end 104A, of side wall 104 to axial end 106B, opposite the axial end 106A, of side wall 106. For axial direction AD1 from the inlet port toward the outlet port, end wall 118 is located past distal end 114B in axial direction AD1.

In an example embodiment, portion 116A of the cavity is radially disposed between side walls 104 and 106. Portion 116B of the cavity is radially disposed between side wall 104 and is free of alignment, in radial direction RD, with side wall 106.

In an example embodiment, fuel filter 100 includes filter element 120, located within cavity 116, and including axially disposed wall 122 and radially disposed wall 124 connected to axially disposed wall 122. Wall 124 is located only in portion 116B. At least a portion of wall 122 is radially aligned with the outlet port. In an example embodiment, portion 122A of wall 122 is radially disposed between side walls 104 and 106 and portion 122B of axially disposed wall 122 is radially aligned with side wall 104 and free of alignment, in radial direction RD, with side wall 106.

Figure 6:
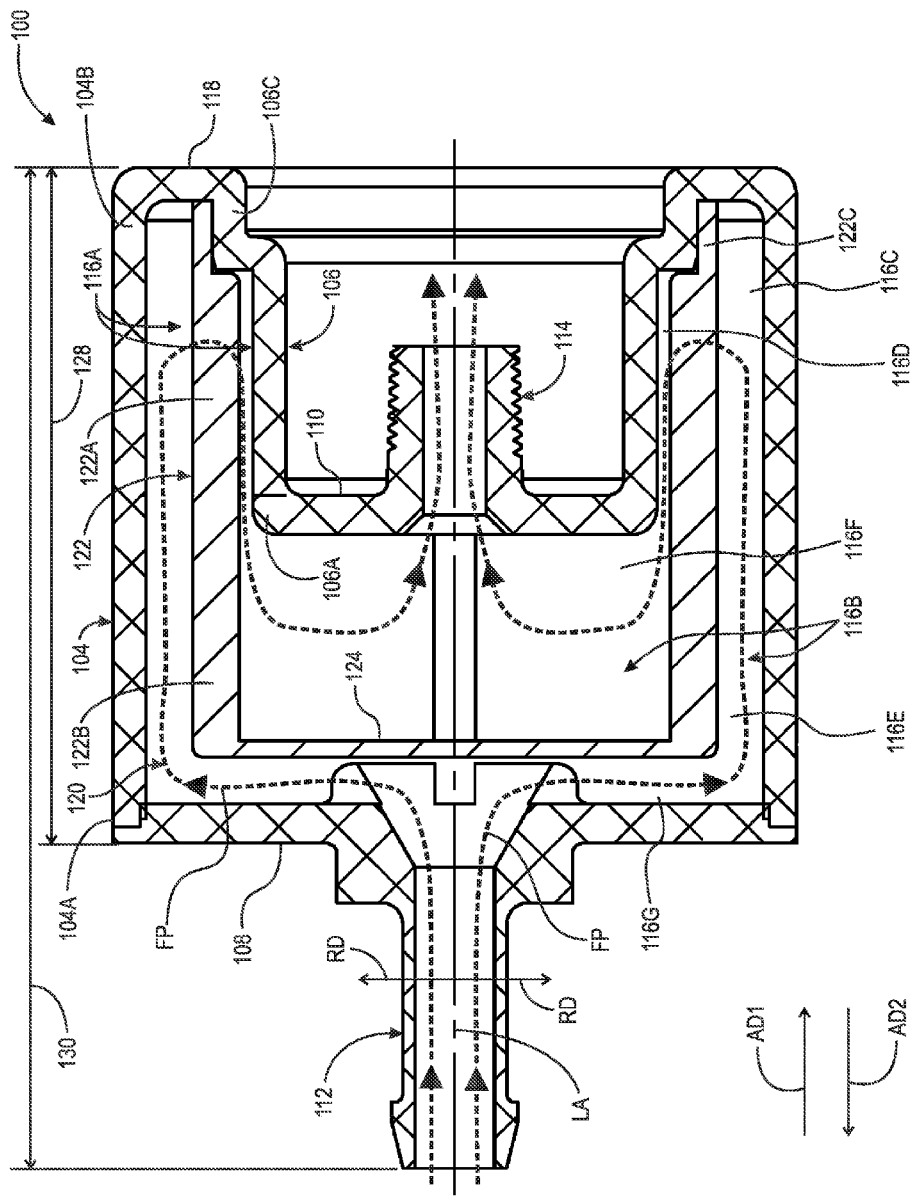
FIG. 6 is a cross-sectional view generally along line 5,6-5,6 in FIG. 4.
Figure 7:
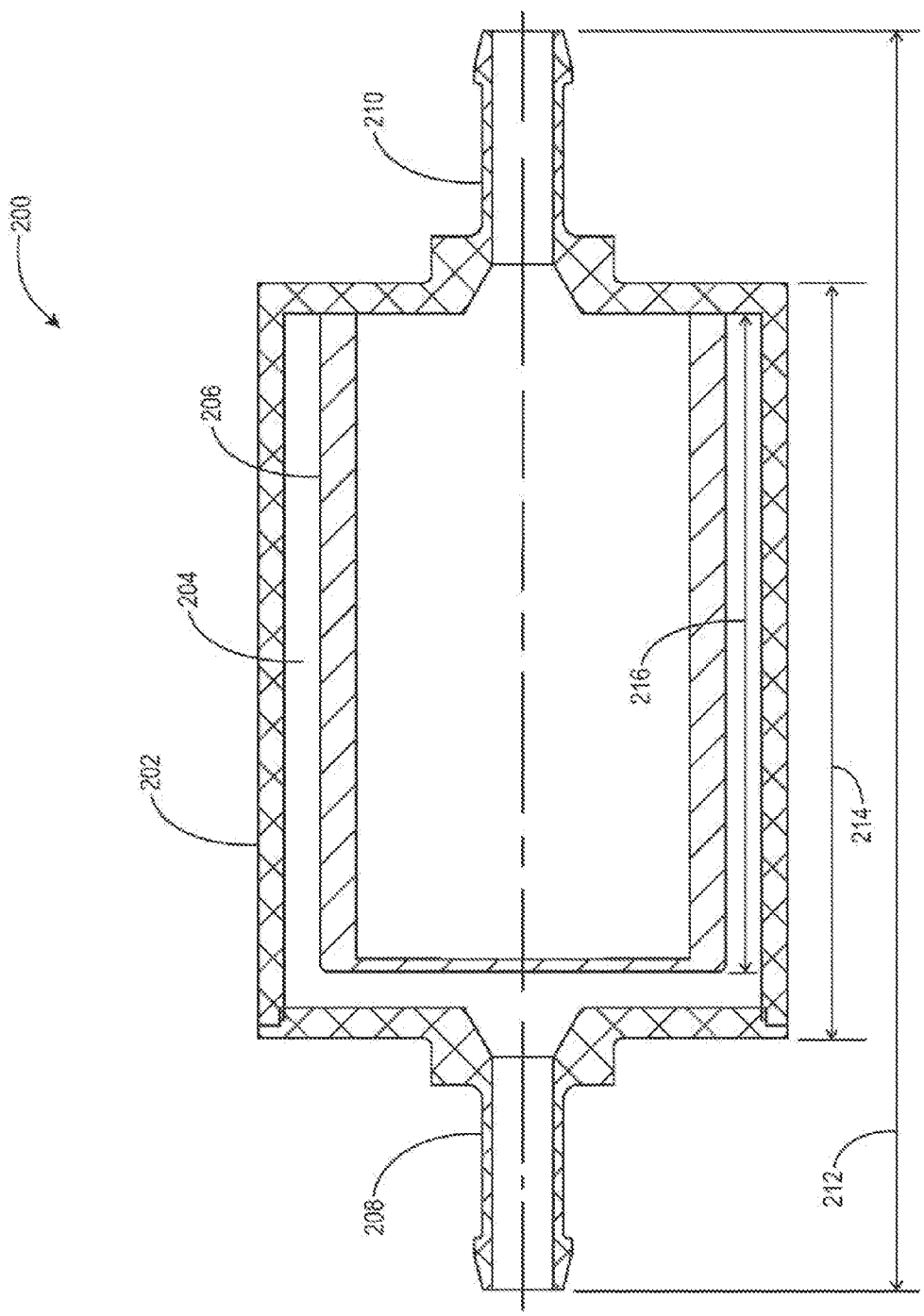
FIG. 7 is a schematic representation of a typical prior art fuel filter.

FIG. 6 is a cross-sectional view generally along line 5,6-5,6 in FIG. 4. The following should be viewed in light of FIGS. 2 through 6. FIG. 6 is used to illustrate aspects of cavity 116. In an example embodiment, portion 116B of cavity 116 is at least partially bounded by end wall 108 in axial direction AD2, opposite direction AD1, and end wall 110 in direction AD1. By bounded by, it is meant that the cavity is located within the walls. In an example embodiment, portion 122A divides portion 116A of cavity 116 into portions 116C and 116D and portion 122B divides portion 116B of cavity 116 into portions 116E and 116F. In an example embodiment, portion 116C opens to portion 116E and portion 116D opens to portion 116F.

In an example embodiment, portion 116G of cavity 116 is axially located between end wall 108 and wall 124 of filter element 120, and is part of portion 116B. In an example embodiment, end 122C of filter wall 122 is sealed against wall 106 and/or wall 118 to ensure that fluid entering cavity 116 from inlet port 112 passes through and not around filter 120. In an example embodiment, wall 106 includes stepped portion 106C and end 122C is sealed against stepped portion 122C and/or end wall 118. Typical fluid flow paths FP are shown in FIG. 6.

In an example embodiment, end wall 108 is formed as a separate end cap including inlet port 112, and walls 104, 106, and 110 are part of an integral unit including outlet port 114.

The capacity or function of fuel filter 100 is at least partly dependent upon how much filter material is available for filter 120, which is at least partly dependent upon length 126 of element 120, which in turn is dependent upon axial length 128 of housing 102. As discussed above, it is desirable to attain a specified filter capacity or function while minimizing overall axial length 130 of filter 100. Advantageously, by recessing outlet port 114 into space SP, filter 100 maximizes lengths 126 and length 128, while minimizing overall length 130 of filter 100. Specifically, outlet port 114 does not contribute to length 130. For example, lengths 126 and 128 can be made equal to lengths 216 and 214 noted above, with overall length 130 being advantageously less than length 212. Thus, the same or greater fuel filter capacity is enabled for filter 100 while minimizing overall axial length 130 of filter 100.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What we claim is:

1. A fuel filter, comprising:
    a housing including:
        a first axially disposed side wall forming a radially outermost portion of a circumference for the housing; and,
        a second axially disposed side wall located radially inward of the first axially disposed wall;
    a cavity enclosed by the housing and including:
        a first portion enclosed, in a radial direction, by only the first axially disposed side wall; and,
        a second portion radially disposed between the first and second axially disposed side walls;
    an inlet port radially centered on the housing and open to the cavity;
    an outlet port radially centered on the housing and including:
        an axial end that opens directly into the first portion of the cavity; and,
        a distal end axially aligned with the second portion of the cavity; and,
    a filter element located in the cavity and radially disposed between said first and second axially disposed side walls;
    wherein the filter element is disposed fluidly between the inlet port and the outlet port so that fluid that passed from the inlet port to the outlet port in the housing must be filtered by the filter element.

2. The fuel filter of claim 1, wherein:
    the housing includes:
        a first radially disposed end wall directly connected to:
            an axial edge of the first axially disposed side wall; and,
            the inlet port; and,
        a second radially disposed end wall directly connected to:
            an axial edge of the second axially disposed side wall; and,
            the outlet port; and,
    the first portion of the cavity is at least partially bounded by:
        the first radially disposed end wall in a first axial direction; and,
        the second radially disposed end wall in a second axial direction, opposite the first axial direction.

3. The fuel filter of claim 1, wherein:
    the housing includes a radially disposed end wall directly connected to respective axial edges of the first and second axially disposed side walls; and,
    the second portion of the cavity is open to the first portion of the cavity and is at least partially bounded by the radially disposed end wall.

4. The fuel filter of claim 1, wherein the filter element comprises:
    an axially disposed wall located in the first and second portions of the cavity; and,
    a radially disposed wall directly connected to the axially disposed wall and located only in the first portion of the cavity.

5. The fuel filter of claim 4, wherein:
    a first portion of the axially disposed wall for the filter element divides the second portion of the cavity into third and fourth portions; and,
    a second portion of the axially disposed wall for the filter element divides a part of the first portion of the cavity into fifth and sixth portions.

6. The fuel filter of claim 5, wherein:
    the third portion is open to the fifth portion; and,
    the fourth portion is open to the sixth portion.

7. The fuel filter of claim 5, wherein:
    the housing includes a radially disposed end wall directly connected to the first axially disposed side wall and the inlet port;
    the radially disposed wall of the filter element encloses the fifth portion in a second axial direction, opposite the first axial direction; and,
    a seventh portion of the cavity is axially located between the radially disposed end wall and the radially disposed wall of the filter element.

8. The fuel filter of claim 6, wherein:
    the outlet port includes a first end and a distal end, the distal end is axially opposite the first end; and,
    the distal end is aligned, in a radial direction, with the third and fourth portions of the cavity.

9. The fuel filter of claim 7, wherein the
    inlet port is open to the first portion of the cavity and extends from a first radially disposed end wall in the first axial direction.

* * * * *